United States Patent
Cervantes

(10) Patent No.: US 11,543,125 B2
(45) Date of Patent: Jan. 3, 2023

(54) PURGING TOOL WITH INTEGRATED PNEUMATIC VALVE

(71) Applicant: Jose Rosario Cervantes, Fresno, CA (US)

(72) Inventor: Jose Rosario Cervantes, Fresno, CA (US)

( * ) Notice: Subject to any disclaimer, the term of this patent is extended or adjusted under 35 U.S.C. 154(b) by 0 days.

(21) Appl. No.: 17/339,585

(22) Filed: Jun. 4, 2021

(65) Prior Publication Data

US 2022/0390102 A1 Dec. 8, 2022

(51) Int. Cl.
*F23K 5/18* (2006.01)
*B60K 15/04* (2006.01)

(52) U.S. Cl.
CPC ............ *F23K 5/18* (2013.01); *B60K 15/0406* (2013.01)

(58) Field of Classification Search
CPC ............................... F23K 5/18; B60K 15/0406
USPC .................................. 141/38, 67; 123/198 R
See application file for complete search history.

(56) References Cited

U.S. PATENT DOCUMENTS

| | | | |
|---|---|---|---|
| 1,424,369 A * | 8/1922 | Midgley | F02M 37/02 137/590 |
| 3,938,692 A | 2/1976 | Crute | |
| 4,401,093 A | 8/1983 | Gates, Jr. et al. | |
| 4,540,103 A | 9/1985 | Kasugai et al. | |
| 4,572,396 A | 2/1986 | Kasugai et al. | |
| 4,699,189 A * | 10/1987 | Murray | F17C 13/002 141/70 |
| 5,452,819 A * | 9/1995 | Vance | B60K 15/0406 220/DIG. 16 |
| 2020/0025153 A1 * | 1/2020 | Tamas | F02M 21/0242 |

FOREIGN PATENT DOCUMENTS

WO 2015101818 7/2015

OTHER PUBLICATIONS

Diesel Place Forum, "Who made the fuel cap with schrader valve??" discussion retrieved on Mar. 30, 2021 from "https://www.dieselplace.com/threads/who-made-the-fuel-cap-with-schrader-valve.216622/".
Eriding Bike Gas Tank Cap Fuel Product description retrieved on Mar. 30, 2021 from "https://www.amazon.com/Eriding-Aluminum-Alloy-Hexagonal-Breather/dp/B07R77L3B6/".
Billet Aluminum Fuel Filter Cap Product description retrieved on Mar. 30, 2021 from "https://www.accuratediesel.com/shop/284.html".

* cited by examiner

*Primary Examiner* — Timothy L Maust
*Assistant Examiner* — Christopher M Afful
(74) *Attorney, Agent, or Firm* — Sierra IP Law, PC; William K. Nelson

(57) ABSTRACT

A purging tool is disclosed that is operable to enable a user to utilize a pumping device to create an influx of air/pressure within a fuel tank to purge blockages with a fuel tank and associated fuel lines, herein after referred to as the fuel system. The purging tool comprises an integrated pneumatic valve operable to interface with a pumping device. The purging tool may further comprise a shape operable to be easily adapted to standardized fuel inlets.

10 Claims, 12 Drawing Sheets

PURGING TOOL WITH INTEGRATED PNEUMATIC VALVE

FIELD OF THE INVENTION

The present invention relates to a novel purging tool. More particularly, embodiments of the present invention pertain to an improved purging tool for purging blockages from a fuel tank and its associated fuel line(s).

DISCUSSION OF THE BACKGROUND

Common power tools typically utilize gasoline as a source of power. However, like many other natural fuel sources, gasoline has some known drawbacks, including susceptibility to deterioration over time. In particular, gasoline is susceptible to fuel oxidation, which may happen over the course of a few months and leads to the formation of deposits, such as gum, which may create blockages within a fuel tank and/or its associated fuel lines. This problem is particularly prevalent in gasoline containing ethanol and two-cycle engine fuel used in power tools. Formation of deposits and other contaminations can contribute to the buildup of deposits within a fuel tank. Since power tools are often left without use for extended periods, oxidation and other degradation of fuel left in the tank pose potential problems in the fuel system of such tools. Blockages due to fuel oxidation can become a serious problem for power tools. Solutions to this issue are still needed.

SUMMARY OF THE INVENTION

The present invention relates to an improved fuel system purging tool. Embodiments of the present invention provide cap operable to be attached to the fuel tank of a power tool or other gas-powered device that includes a purging mechanism for purging bubbles, deposits, and debris that may block the fuel lines or other components of a fuel system in a liquid fuel powered device. The purging mechanism may be engaged with a pumping device (e.g., a compressor, hand pump, or other pneumatic tool) to create an influx of air/pressure into a fuel tank and system of a liquid fuel powered device to purge blockages with a fuel tank and associated fuel lines, herein after referred to as the fuel system. The purging device may comprise an integrated pneumatic valve operable to interface with a pumping device. The purging device may have a shape that is easily adapted to the most commonly utilized fuel inlets. In some embodiments, the purging device may have a similar construction to a fuel cap for the fuel tank of a power tool or other liquid fuel-powered device.

The present invention enables a user to connect pumping device to the fuel inlet and generate an influx of air of sufficient pressure to purge blockages. In some embodiments, the device may be operable to clear blockages caused by products of fuel oxidation such as gum and other viscous material. In some embodiments, the device may be operable to clear blockages due to air bubbles, including air bubbles comprised of products of fuel oxidation. For example, the pressure generated by a pumping device may burst air bubbles or push out gum that's clogging the fuel system. In some embodiments, the device may be operable to clear blockages of debris created by corrosion of the interior of the fuel system.

The present invention comprises an integrated pneumatic valve, with the pumping interface located on the superior surface of the cap and the orifice of the valve located on the interior surface of the purging device. The valve may be any pneumatic valve operable to utilize a pumping device to generate an influx of air of sufficient pressure to clear blockages, such as Schrader valve, Presta valve, check valve, poppet valve, or other appropriate valve design. In some embodiments, the pumping device may be a manual pump, powered/automatic pump, or compressor. For example, the pneumatic valve may comprise a Schrader valve, wherein the pumping device is a manual bike pump or compressor.

In some embodiments, the purging tool may have a construction that resembles a fuel cap for a fuel tank of a power tool or other liquid fuel-powered device and may have an interior structure that compliments that of the fuel inlet such that it creates an air-tight seal wherein only pneumatic valve can adjust the pressure of the fuel system. In some embodiments, the interior structure of the fuel cap comprises a structure complimentary to that of a standardized fuel inlet, such as threading or a pattern. A standardized fuel inlet may comprise the fuel inlet for a particular type of power tool, toolset, power tool manufacturer, type of engine (i.e, two-strokes and four-strokes), automobile, or automobile manufacturer. For example, the inferior surface comprises a hallow cylinder with a threading on the exterior that is complimentary to the fuel inlet structure. As another example, the interior structure may comprise a pattern complimentary to the fuel inlet structure of a two-stroke engine device, such as a chain saw. In such embodiments, the dimensions of the fuel cap and pneumatic valve may also be proportional to those of a standardized fuel inlet. For example, for fuel inlets with a diameter of about 2.125 inches, the standard diameter of lawn mower fuel inlets, the fuel cap may have a diameter between about 2.22 inches to about 2.4 inches while the valve may have a diameter of about 0.4 inches to about 0.8 inches.

In some embodiments, the purging tool may have a dual function as a purging tool and a fuel tank cap and may be left on the fuel tank after a purging operation is performed. In such embodiments, the pneumatic valve may be operable to switch between a pumping mode and a standard operation mode. While the pneumatic valve is in the pumping mode, the pumping device and the pneumatic valve structure, and the purging tool in general may have an airtight seal while using the pumping device to purge blockages. While the pneumatic valve is in standard operation mode, the valve may behave as a one-way release valve, relieving pressure once the pressure within the fuel tank (the fuel vapor pressure) surpasses a pressure threshold. In standard operation mode, the fuel cap essentially behaves like a vented fuel cap, preventing the formation of a vacuum within the fuel tank as the fuel is utilized. This enables fuel cap to remain affixed to the fuel inlet indefinitely, eliminating the need to swap the device's original fuel cap with the purging tool when there is a blockage.

In some embodiments, the fuel cap further comprises a pressure gauge to enable a user to easily monitor and adjust the fuel pressure of the fuel system until the pressure is within an operational window. For example, if the fuel pressure of the fuel system of a device is at 4 PSI but has an operational window between 8-15 PSI, the user may simply attach the pump and monitor the pressure of the fuel tank as the pressure is increased via a pumping device.

The exterior structure of the purging tool may comprise an exterior grip structure to enable a user to easily rotate or place the purging tool on the fuel inlet as required. The grip may be comprised of nitrile, leather, silicone, Polyvinyl Chloride (PVC), and/or other material having a sufficient coefficient of friction to allow the user to grasp and achieve purchase on the surface to remove the purging tool from a fuel tank or other structure to which it is attached. The purging tool may further comprise a surface pattern that increases the amount of friction on the grip. For example, the grip may be made of PVC and comprise a pattern of indents that may accommodate at least one finger, enabling the user to firmly grip the purging tool.

The present invention comprises a method for purging blockages within a fuel system and may include the steps of: exposing the fuel inlet by removing the original fuel cap of a fuel system, providing the purging tool as described herein, securing the purging tool to the fuel inlet such that it creates an air tight seal, attaching a pumping device or compressor to the pumping interface, utilizing the pumping device to create an influx of air/pressure within a fuel tank to purge blockages within the fuel system, removing the purging tool and placing the original fuel cap of the fuel system back on the fuel inlet.

The method may alternatively comprise switching the purging tool from a standard operation mode, wherein the purging tool functions as a standard vented valve, switching the device to a pumping mode before attaching a pumping device, switching the purging tool to standard operation mode after the blockages have been purged, eliminating the need to place the original fuel cap back on the fuel system.

The present invention may also comprise a method of adjusting the fuel pressure for a fuel system to enable proper operation and may include the following steps: exposing the fuel inlet by removing the original fuel cap of a fuel system, providing the purging tool with a pressure gauge as disclosed in the present invention, securing the purging tool to the fuel inlet such that it creates an airtight seal, attaching a pumping device or compressor to the pumping interface, monitoring the fuel pressure of the fuel system via the pressure gauge and adjusting it via the pumping device until the fuel pressure is within an operational window.

It is an object of the present invention to provide an improved purging tool operable to purge blockages within a fuel system.

It is an object of the present invention to provide an improved purging tool comprising a pneumatic valve with a pumping interface operable to utilize a pumping device to create an influx of air/pressure within a fuel tank to purge blockages within the fuel system.

It is also an object of the present invention to provide an improved purging tool operable to purge blockages that are the result of fuel oxidation such as gum and other viscous material.

It is also an object of the present invention to provide an improved purging tool operable to purge blockages that are the result of air bubbles, including air bubbles comprised of products of fuel oxidation.

It is also an object of the present invention to provide an improved purging tool operable to purge blockages of debris created by corrosion or other damage, including damage caused by the fuel.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Figure 1:
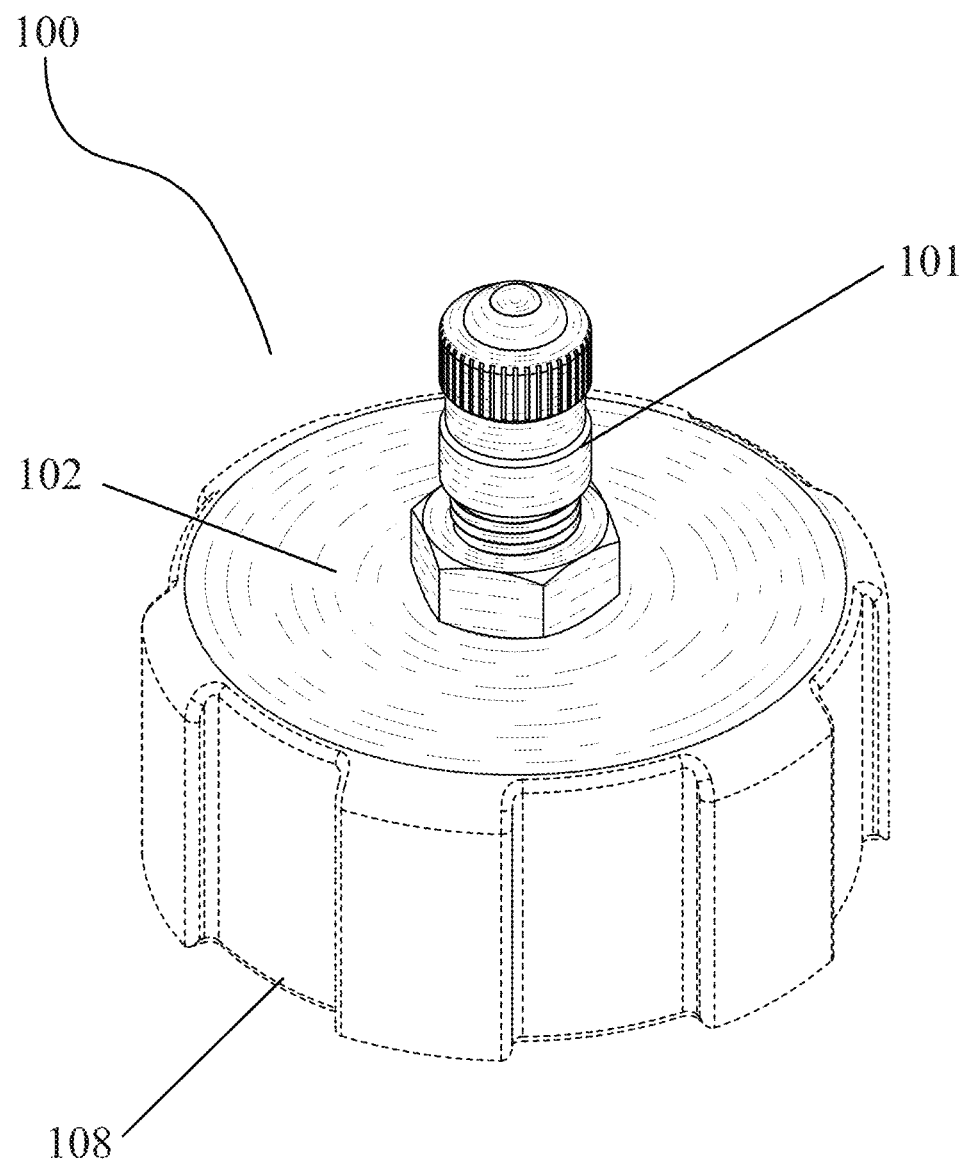
FIG. 1 shows a perspective view of an improved purging tool, according to an embodiment of the present invention.
Figure 2:
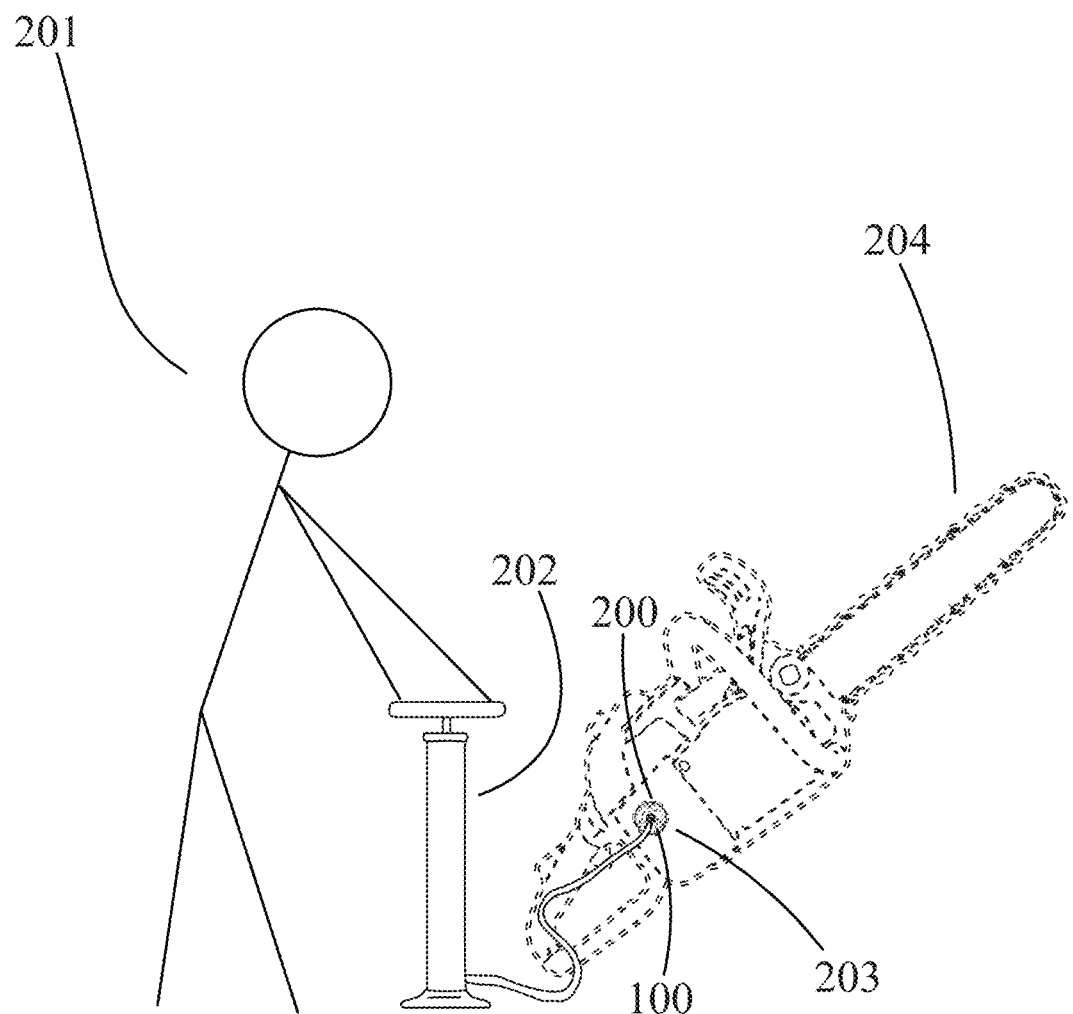
FIG. 2 shows an environmental view of an improved purging tool being used on a power tool, according to an embodiment of the present invention.
Figure 3:
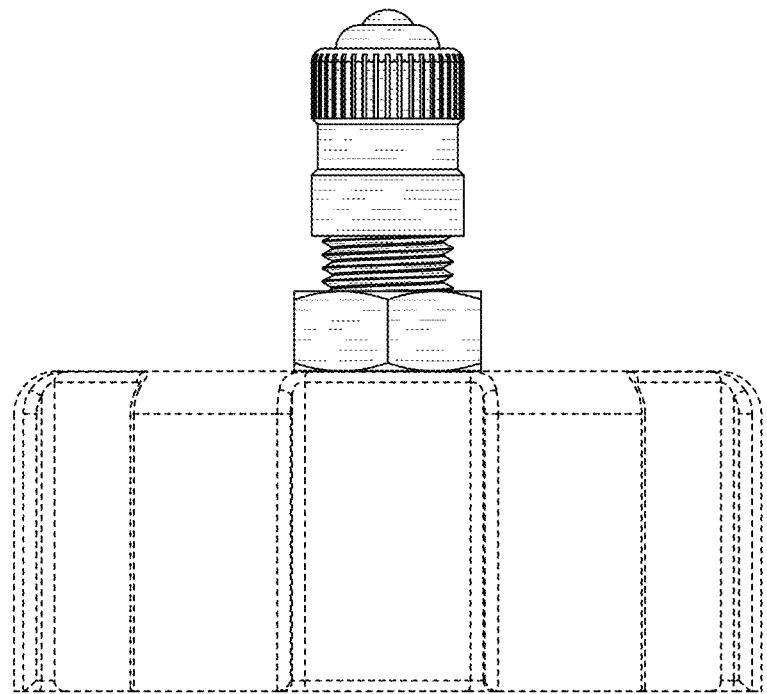
FIG. 3 shows a front view of an improved purging tool, according to an embodiment of the present invention.
Figure 4:
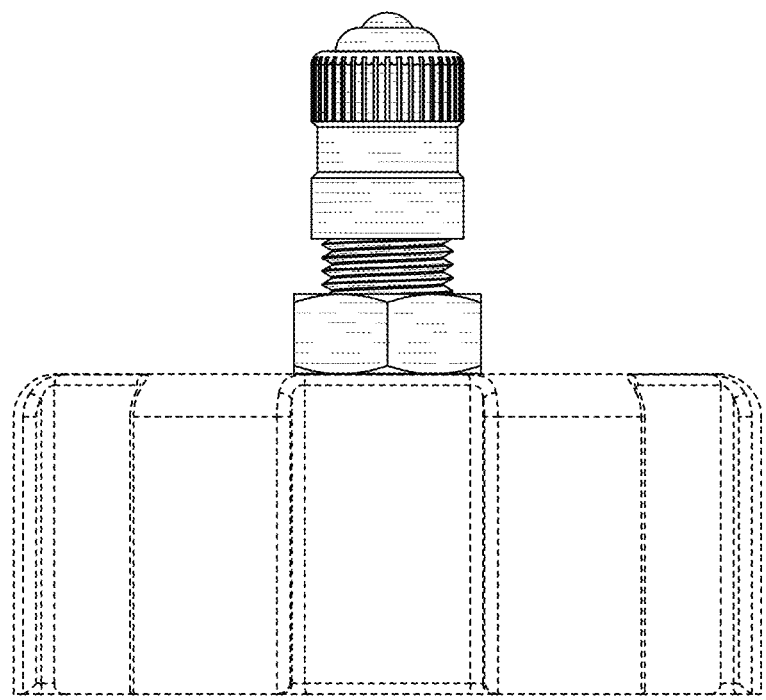
FIG. 4 shows a rear view of an improved purging tool, according to an embodiment of the present invention.
Figure 5:
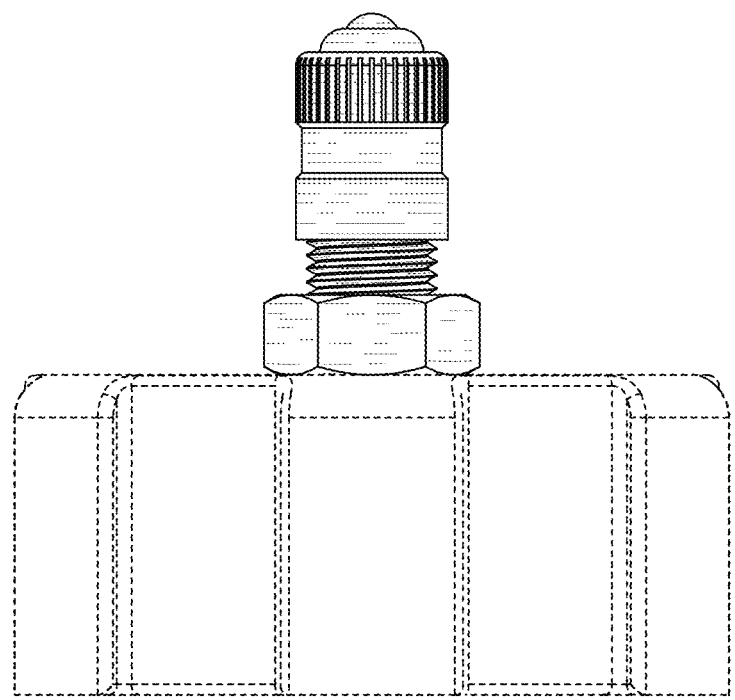
FIG. 5 shows a right side view of an improved purging tool, according to an embodiment of the present invention.
Figure 6:
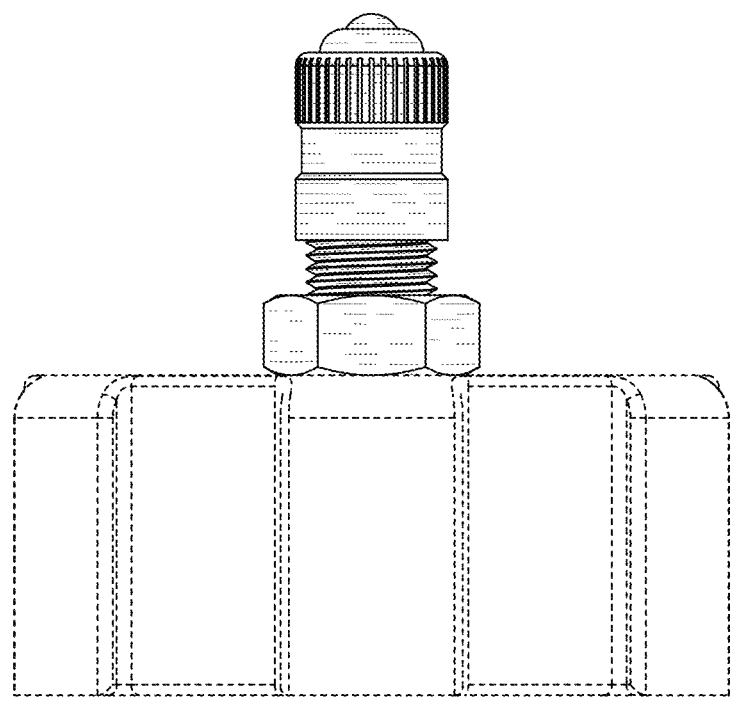
FIG. 6 shows a left side view of an improved purging tool, according to an embodiment of the present invention.
Figure 7:
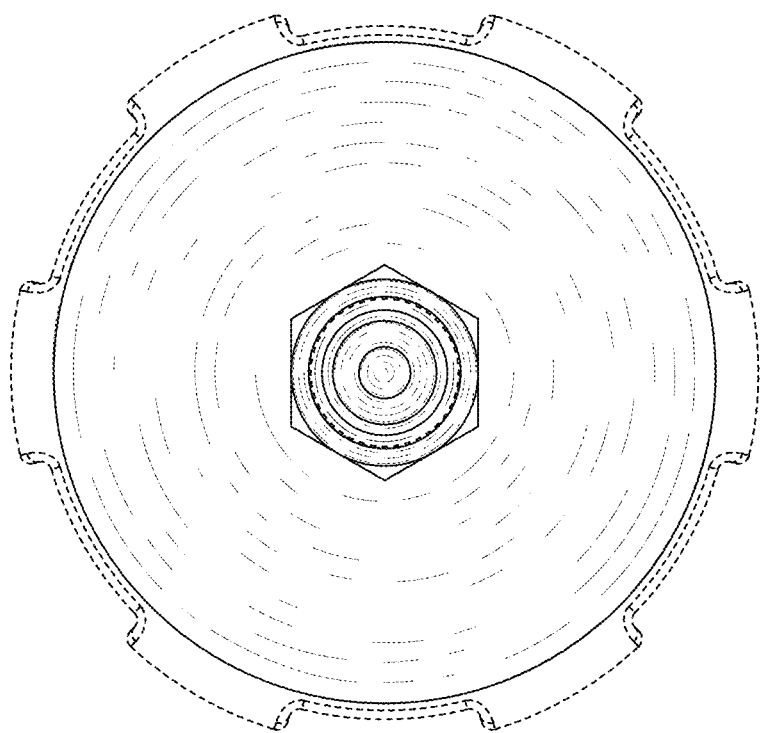
FIG. 7 shows a top view of an improved purging tool, according to an embodiment of the present invention.

As shown in FIG. 1 and FIG. 2, embodiments of the present invention provide an improved purging tool operable 100 to enable a user 201 to utilize a pumping device 202 to create an influx of air/pressure within a fuel system 203. The purging tool comprises an integrated pneumatic valve 101 operable to interface with a pumping device 202. The purging tool further comprises a shape operable to be easily adapted to the most commonly utilized fuel inlets 200.

Figure 12:
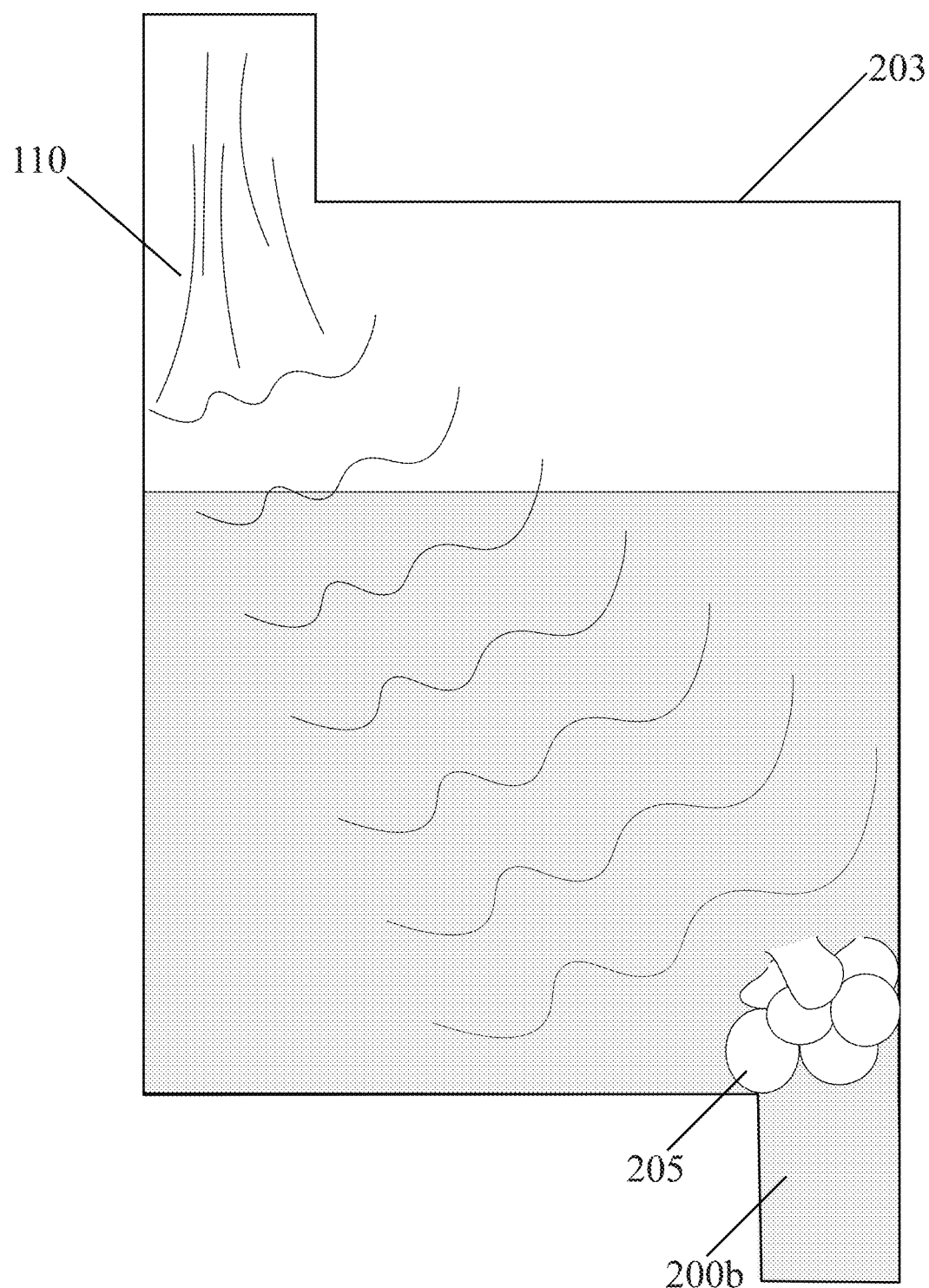
FIG. 12 shows the process of blockages within a fuel system being purged by an influx of air generated by the improved purging tool.

As shown in FIG. 2 and FIG. 12, The present invention enables a user to connect pumping device 202 to the fuel inlet 200 and generate an influx of air 110 of sufficient pressure to purge blockages 205 through at least one fuel outlet or fuel line 200b. In some embodiments, the purging tool may be operable to clear blockages caused by products of fuel oxidation such as gum and other viscous material. In some embodiments, the purging tool may be operable to clear blockages due to air bubbles 205, including air bubbles comprised of products of fuel oxidation. For example, the pressure generated by a pumping device 202 may burst air bubbles or push out gum that's clogging the fuel system. In some embodiments, the purging tool may be operable to clear blockages of debris created by corrosion and internal damage.

Figure 8:
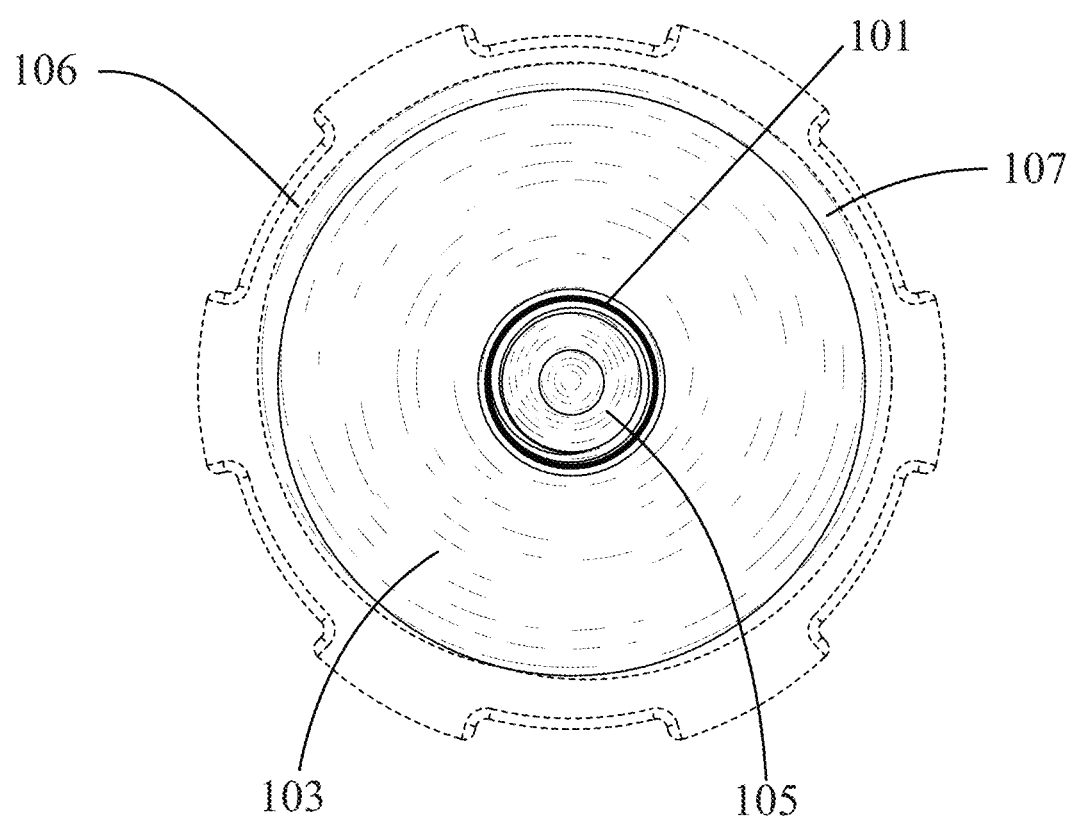
FIG. 8 shows a bottom view of an improved purging tool, according to an embodiment of the present invention.
Figure 9:
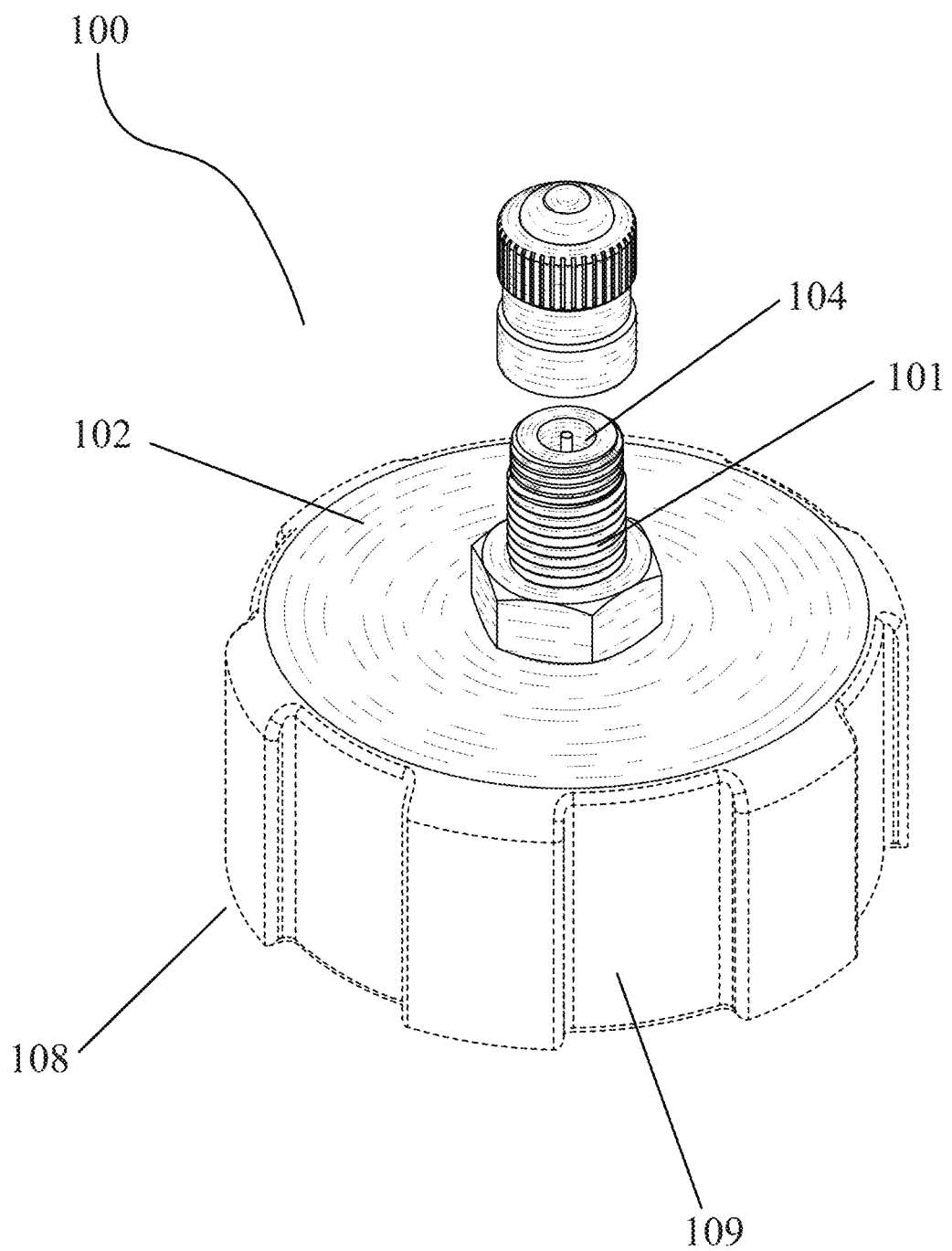
FIG. 9 shows a perspective view of an improved purging tool with the pneumatic valve cap removed, according to an embodiment of the present invention.
Figure 10:
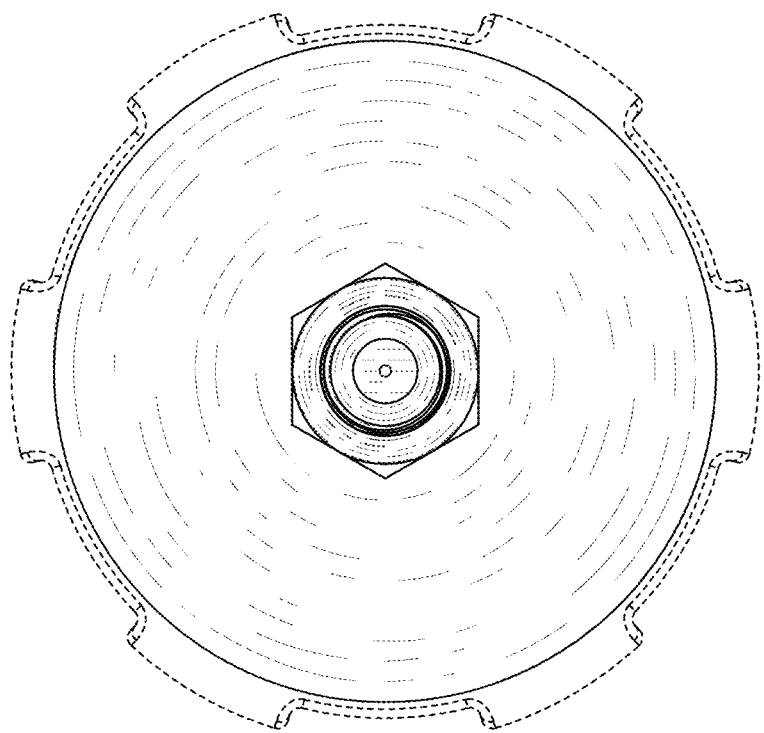
FIG. 10 shows a top view of an improved purging tool with the pneumatic valve cap removed, according to an embodiment of the present invention.
Figure 11:
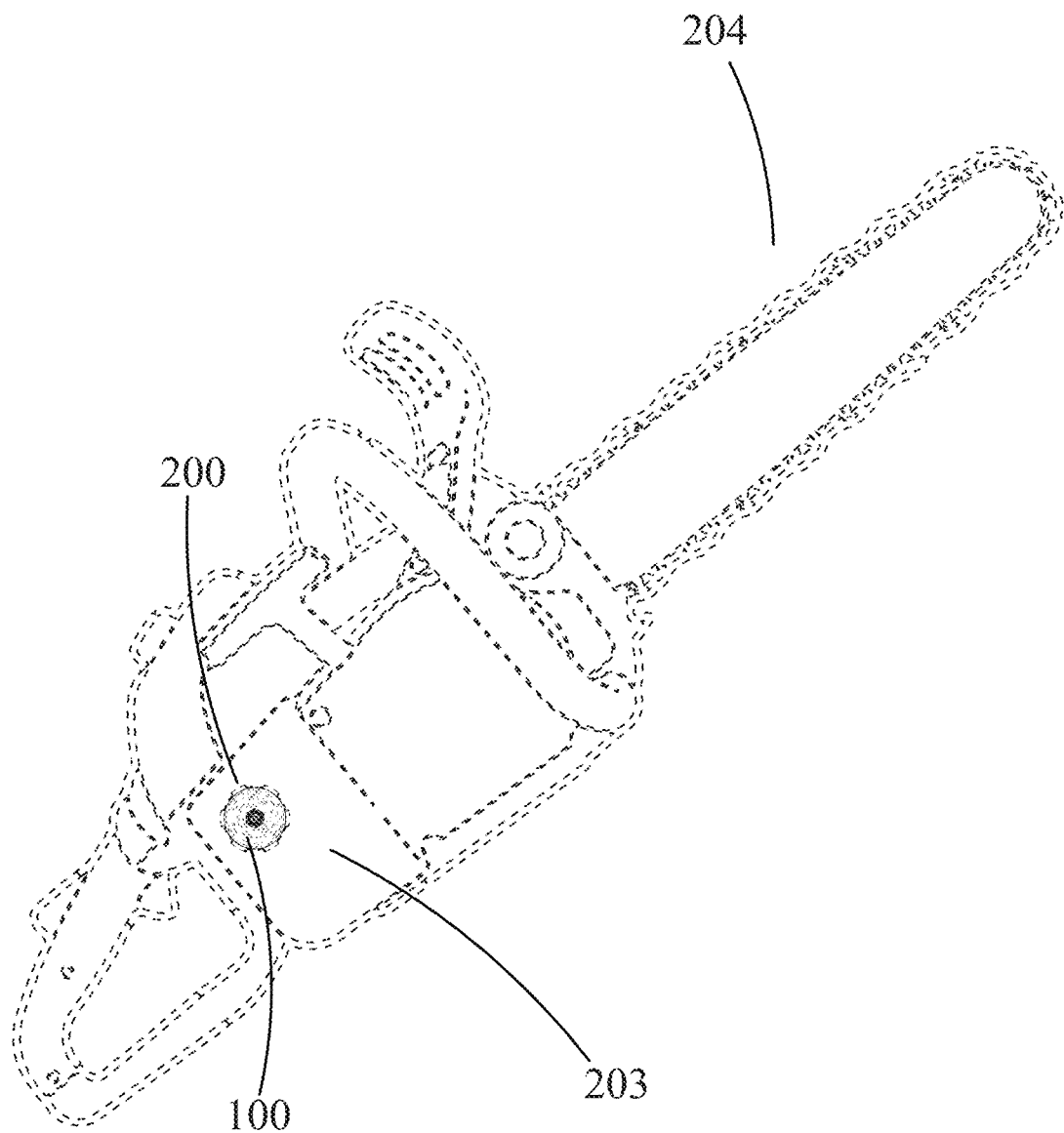
FIG. 11 shows an environmental view of an improved purging tool on a power tool, according to an embodiment of the present invention.

As shown in FIG. 9, the present invention comprises an integrated pneumatic 101 valve, with the pumping interface 104 located on the superior surface 102 of the purging tool. As shown on FIG. 8, orifice of the valve 105 is located on the inferior surface 103 of the purging tool. The valve 101 may be any pneumatic valve operable to utilize a pumping device to generate an influx of air of sufficient pressure to clear blockages, such as Schrader valve, Presta valve, check valve, poppet valve, or other appropriate valve design. In some embodiments, the pumping device may be a manual pump or compressor. In some embodiments powered/automatic pump or compressor. For example, as shown in FIG. 1 and FIG. 2, the pneumatic valve 101 may comprise a Schrader valve, wherein the pumping device 202 is a manual bike pump.

As shown in FIG. 8, the purging tool has an interior structure 106 that compliments that of the fuel inlet such that it creates an air-tight seal wherein only pneumatic valve 101 can adjust the pressure of the fuel system 203. In some embodiments, the interior structure 106 of the purging tool comprises a structure complimentary to that of a standardized fuel inlet 200, such as threading 107 or a pattern. A standardized fuel inlet may comprise the fuel inlet for a particular type of power tool 204, toolset, power tool manufacturer, type of engine (i.e, two-strokes and four-strokes), automobile, or automobile manufacturer. For example, the purging tool may have an interior structure similar to that of a standard fuel cap, wherein the inferior surface comprises a hallow cylinder with a threading on the exterior that is complimentary to the fuel inlet structure of a plethora of older vehicles. As another example, the interior structure 106 may comprise a pattern complimentary to the fuel inlet 200 structure of a two-stroke engine device, such as a chain saw 204. In such embodiments, the dimensions of the purging tool 100 and pneumatic valve 101 may also be proportional to those of a standardized fuel inlet 200. For example, for fuel inlets with a diameter of about 2.125 inches, the standard diameter of lawn mower fuel inlets, the purging tool 100 may have a diameter between about 2.22 inches to about 2.4 inches while the valve 101 may have a diameter of about 0.4 inches to about 0.8 inches.

In some embodiments, the pneumatic valve 101 may be operable to switch between a pumping mode and a standard operation mode. While the pneumatic valve 101 is in the pumping mode, the fuel system 203 has an airtight seal and may utilize a pumping device to purge blockages. While the pneumatic valve 101 is in standard operation mode, the valve behaves as a one-way release valve, relieving pressure once the pressure within the fuel tank, the fuel pressure, surpasses a pressure window. In standard operation mode, the fuel cap essentially behaves like a vented fuel cap, preventing the formation of a vacuum within the fuel tank as the fuel is utilized. This enables the purging tool to remain affixed to the fuel inlet 200 indefinitely, eliminating the need to swap the device's original fuel cap with the present invention every time there's a blockage.

In some embodiments, the purging tool 100 further comprises a pressure gauge to enable a user to easily monitor and adjust the fuel pressure of the fuel system until the pressure is within an operational pressure threshold. For example, if the fuel pressure of the fuel system of a device is at 4 PSI but has an operational window between 8-15 PSI, the user may simply attach the pump and monitor the pressure of the fuel tank as the pressure is increased via a pumping device.

As shown in FIG. 9, the exterior structure of the purging tool 100 may comprise grip 108 to enable a user to easily rotate or place the purging tool on the fuel inlet as required. The grip may be comprised of rough material such as nitrile, leather, silicone, Polyvinyl Chloride (PVC), and/or other material having a sufficient coefficient of friction to allow the user to grasp and achieve purchase on the surface and may further comprise a pattern that increases the amount of friction on the grip. For example, as shown in FIG. 1, the grip may be made of PVC and comprise a pattern of indents 109 that may accommodate at least one finger, enabling the user to firmly grip the purging tool.

As shown in FIG. 2 and FIG. 12, the present invention comprises a method for purging blockages 205 within a fuel system 203 and may include the steps of: exposing the fuel inlet by removing the original fuel cap of a fuel system, providing the purging tool 100, securing the purging tool 100 to the fuel inlet 200 such that it creates an air tight seal, attaching a pumping device 202 or compressor to the pumping interface, utilizing the pumping device to create an influx of air/pressure 110 within a fuel tank to purge blockages within the fuel system 203, removing the device and placing the original fuel cap of the fuel system back on the fuel inlet.

The method may alternatively comprise switching the device from a standard operation mode, wherein the purging tool 100 functions as a standard vented valve, switching the device to a pumping mode before attaching a pumping device, switching the device back to standard operation mode after the blockages have been purged, eliminating the need to place the original fuel cap back on the fuel system.

The present invention may also comprise a method of adjusting the fuel pressure for a fuel system 203 to enable proper operation and may include the following steps: exposing the fuel inlet by removing the original fuel cap of a fuel system, providing the purging tool with a pressure gauge as disclosed in the present invention, securing the purging tool to the fuel inlet such that it creates an air tight seal, attaching a pumping device or compressor to the pumping interface, monitoring the fuel pressure of the fuel system via the pressure gauge and adjusting it via the pumping device until the fuel pressure is within an operational window.

It should be understood that the foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to best explain the principles of the invention and its practical application, and to thereby enable others skilled in the art to best utilize the invention and various embodiments with various modifications as are suited to the particular use contemplated.

What is claimed:

1. A method of purging blockages within a fuel system comprising the following steps:
   a. providing a fuel cap operable to seal a fuel inlet of a fuel tank and comprising an integrated pneumatic valve operable to interface with a pumping device,
   b. attaching said fuel cap to said fuel inlet of a gasoline engine fuel system such that it creates an air-tight seal,
   c. attaching a pumping device to said pneumatic valve, and
   d. utilizing said pumping device to provide an influx of pressurized air into said fuel inlet to purge said blockages from said gasoline engine fuel system.

2. The method of claim 1, wherein said blockages comprises solid products from fuel oxidation within said gasoline engine fuel system.

3. The method of claim 1, wherein said blockages comprises air bubbles trapped within said fuel system.

4. The method of claim 1, wherein said pneumatic valve is a Schrader valve, Presta valve, check valve, or poppet valve allowing said pumping device to be attached to said fuel system with a fluid tight seal.

5. The method of claim 4, wherein said pumping device is a manual pump or an air compressor.

6. The method of claim 1, wherein said gasoline engine fuel system comprises said fuel tank and at least one fuel line.

7. The method of claim 1, further comprising the steps of:
  a. switching the fuel cap from a normal operation mode, wherein the fuel cap acts as a standard vented fuel cap, to a pumping mode before connecting said pumping device, and
  b. switching the fuel cap from said pumping mode to said normal operation mode once the blockages have been purged.

8. The method of claim 1, wherein said gasoline engine fuel system fuel inlet is for a device powered by a two-stroke engine and said fuel cap comprises and threading that is complimentary to said fuel inlet.

9. The method of claim 1, wherein said gasoline engine fuel system fuel inlet is for a device powered by a four-stroke engine and said fuel cap comprises an interior structure with a shape that is complimentary to said fuel inlet.

10. The method of claim 1, wherein said gasoline engine fuel system fuel inlet is for a gasoline powered lawn mower, chain saw, leaf blower, or trimmer and said fuel cap comprises and threading that is complimentary to said fuel inlet.

* * * * *